United States Patent

[11] 3,614,030

| [72] | Inventor | Paul S. Moller, |
| | | 1308 "B" St., Davis, Calif. 95616 |
| [21] | Appl. No. | 883,980 |
| [22] | Filed | Dec. 10, 1969 |
| [45] | Patented | Oct. 19, 1971 |

[54] AIRCRAFT
3 Claims, 5 Drawing Figs.

| [52] | U.S. Cl. | 244/23 C |
| [51] | Int. Cl. | B64c 29/04 |
| [50] | Field of Search | 244/12, 23 |

[56] References Cited
UNITED STATES PATENTS

| 3,082,977 | 3/1963 | Arlin | 244/12 C |
| 3,161,374 | 12/1964 | Allred et al. | 244/12 B |
| 3,432,120 | 3/1969 | Guerrero | 244/93 |
| 3,241,771 | 3/1966 | Erwin | 239/265.25 |

Primary Examiner—Milton Buchler
Assistant Examiner—Steven W. Weinrieb
Attorney—Lothrop & West ABSTRACT: A disclike aircraft body is substantially a figure of revolution about a main axis and has a plurality of air ducts extending through the body in a direction parallel to said axis, the ducts being arranged in arcuate series except in the foremost and rearmost positions. Each of the ducts has individually controlled means for inducing airflow downwardly therethrough such as a fan rotating on an airflow axis parallel to the main axis or a thrust augmentor supplied with pressure gas from a common source. Downstream of the inducing means is an individually controlled rotary member movable about the airflow axis and having deflectors movable about transverse axes to govern the discharge of air from the ducts.

INVENTOR
PAUL S. MOLLER
BY
Lothrop & West
ATTORNEYS

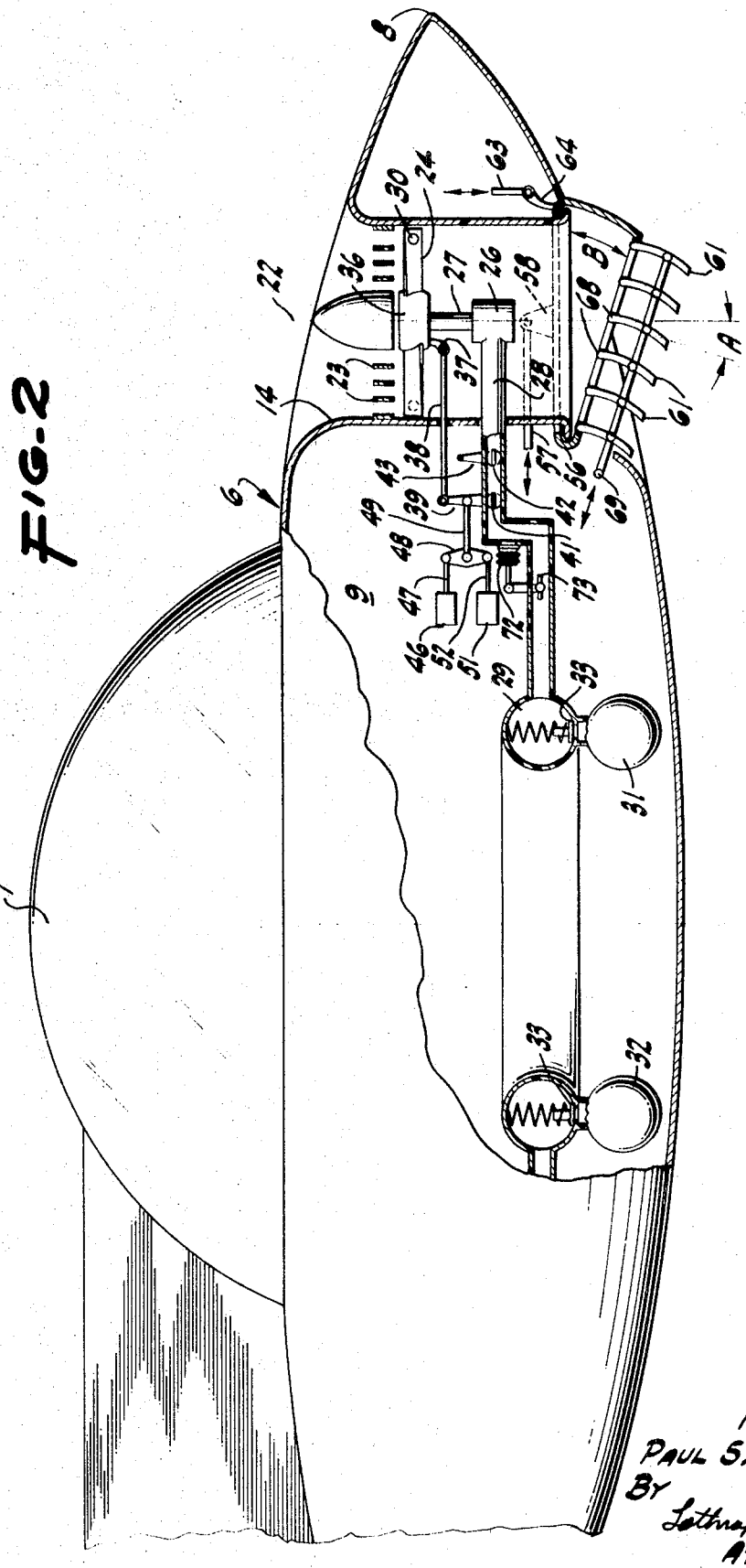

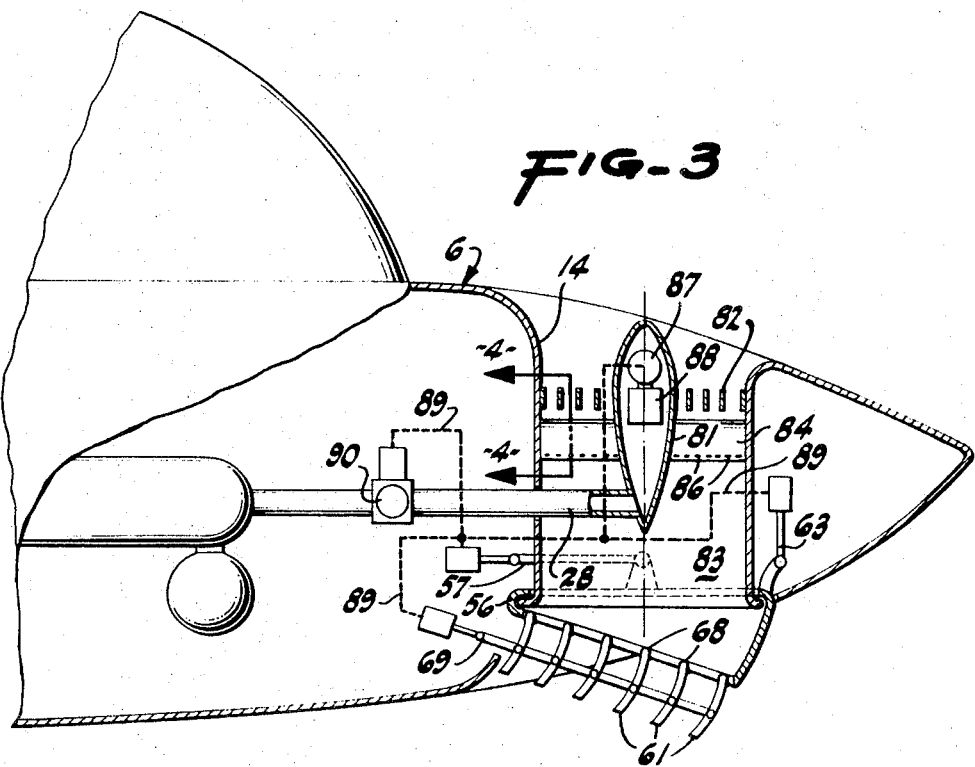
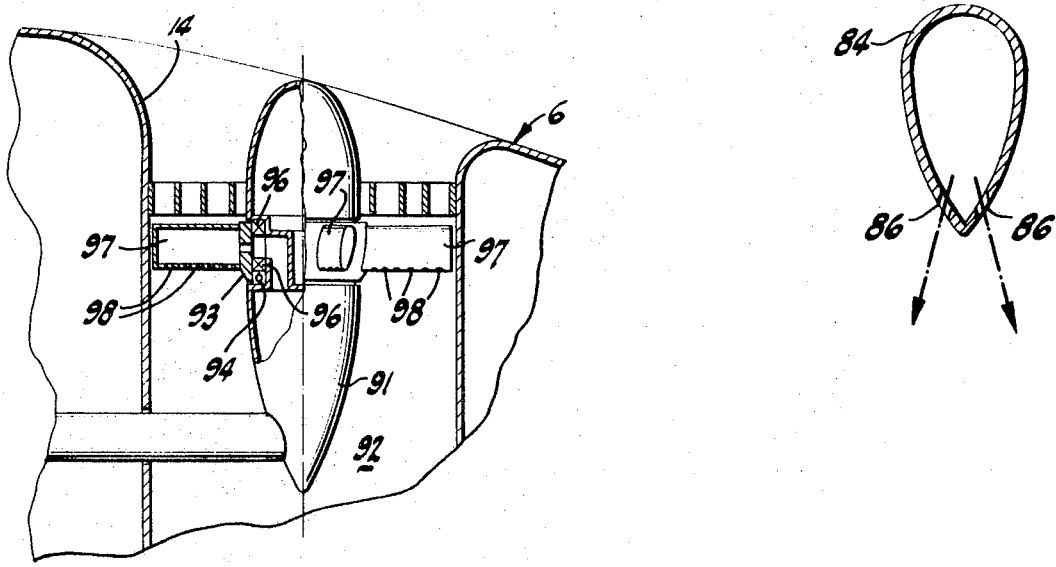
INVENTOR
PAUL S. MOLLER
By Lothrop & West
ATTORNEYS

AIRCRAFT

There is always need for an aircraft which is particularly suitable for certain characters of work, particularly in the relatively light field in which a vehicle is especially adapted to carry payloads around 1,000 pounds and have an air speed around 300 miles per hour. It is likewise a desideratum to afford such a vehicle which is stable, is easily controlled, has high efficiency, and is so constructed as to be safe.

It is therefore an object of the invention to provide an aircraft with the foregoing characteristics and advantages as well as certain others.

Another object of the invention is to provide an aircraft related to the aircraft shown in my U.S. Pat. No. 3,410,507, issued Nov. 12, 1968.

Another object is in general to improve aircraft.

The foregoing and other objects are attained in the invention embodiments described in the accompanying description and illustrated in the accompanying drawings, in which:

FIG. 2 is a diagrammatic, symmetrical cross section, the plane of section being indicated by the line 2—2 of FIG. 1 and having parts broken away for size reduction;

FIG. 3 is a partial cross-sectional view, like FIG. 2, showing diagrammatically an aircraft modified to use thrust augmentors; and FIG. 4 is a cross section, the plane of which is indicated by the line 4—4 of FIG. 3.

FIG. 5 is a side elevation, portions being broken away of a modified form of thrust augmentor.

Figure 1:
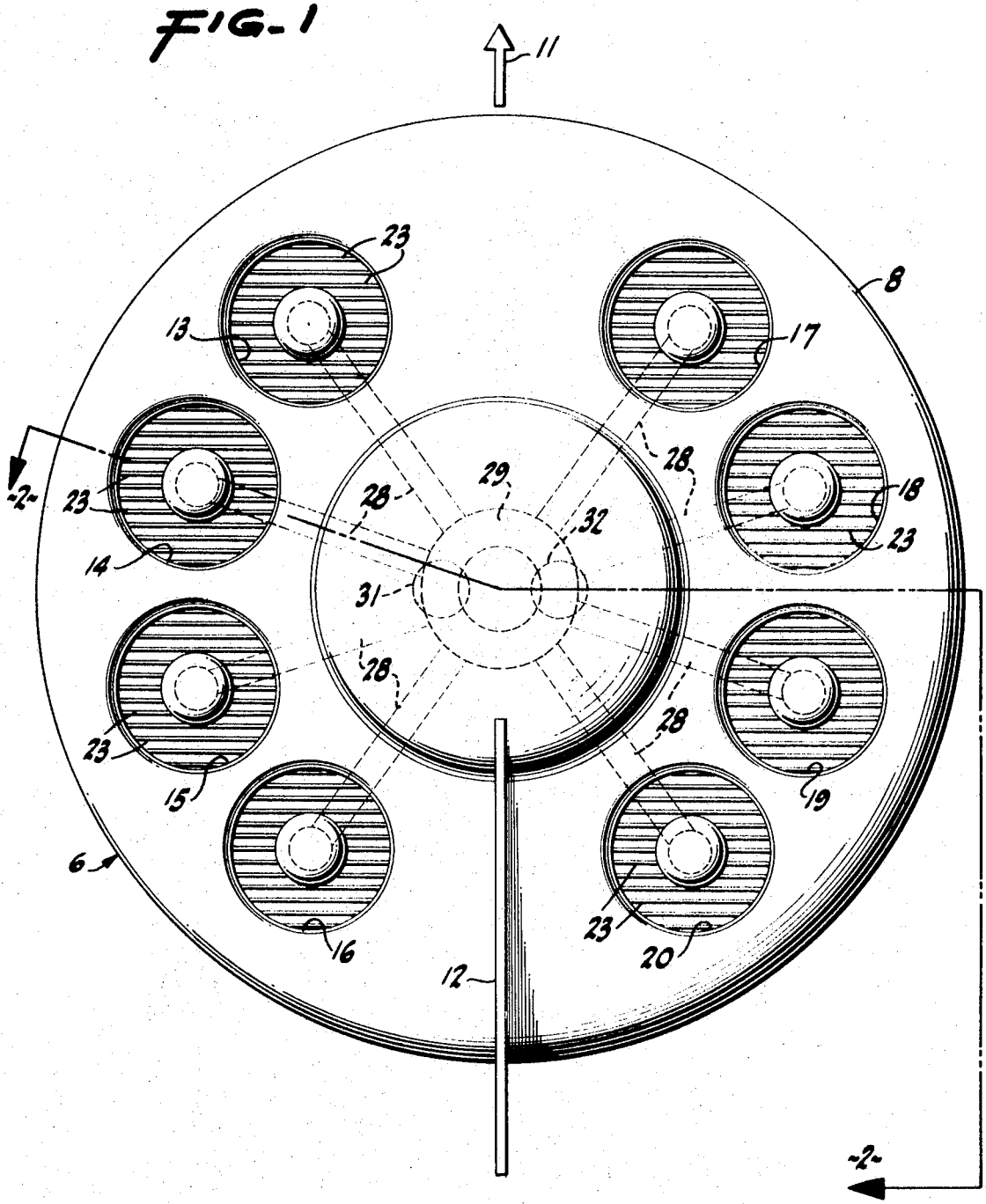
FIG. 1 is a diagrammatic plan of an aircraft embodied pursuant to the invention.

While there are many variants possible in embodying the present invention, my present preference is to construct an aircraft substantially in accordance with the particular embodiments disclosed herein.

In this instance the aircraft includes a main body 6 formed as a figure of revolution about a generally vertical main axis 7. The body is a somewhat flattened disc having a rim 8 and a generally hollow interior 9 in which machinery is installed and in which the passengers and other load are housed.

The shape involved is capable of operating at various attitudes and in all directions from the axis 7. For the most part the aircraft is intended to travel in a forward direction as indicated by the arrow 11 of FIG. 1 and so the body is provided with a fore and aft fin member 12 for yaw stability and control.

Pursuant to the invention the disc is provided with a generally circular array of air ducts 13, 14, 15 and 16 on one side and 17, 18, 19 and 20 on the other side. The ducts extend entirely through the disc body 6, each on its individual one of a number of airflow axes 22, all of which are parallel to the main axis 7. The ducts are arranged adjacent to each other in a circle except that in the forward and rearward portions of the body there is left an uninterrupted body area in order to allow for adequate air movement into the base region to prevent aerodynamic base drag. Since the vehicle relies upon air propelled downwardly through the various air ducts and issuing therefrom in the form of jets, I often refer to this aircraft as a "discojet" since it is of a discoid configuration and relies upon jets for its lift.

In the usual construction, all of the ducts are substantially the same in their functioning and mode of operation, and a description of one is intended to apply equally to all of the others.

Since airflow is into the duct 14, for example, (FIG. 1 and FIG. 2) from the top, there is a corresponding opening in the shell of the body 6. The opening is almost immediately screened by entrance vanes 23 acting not only as air guides but likewise as a mechanical barrier to the entry of large foreign material.

Means are provided to induce air to flow downwardly through the ducts. As shown in FIGS. 1 and 2, each duct has mounted therein a propeller 24 or fan designed to rotate around the axis 22 beneath the vane 23. The fan 24 is supported to revolve generally about the axis 22. Each fan is provided with its own drive motor 26 operated by pressure gas and connected to the fan through an axial shaft 27. The drive motor 26 is diagrammatically illustrated and represents any one of various different forms of driving mechanism. Alternatively, the drive motor 26 can be replaced by tip turbines 30 at the ends of the fan blades, the tip turbines being supplied with the pressure gas that otherwise would supply the motor 26.

In the present instance it is preferred that the motor 26 be operated by hot gas received through a pipe 28. For safety and for other operating reasons the individual motors have individual pipes 28, but each pipe extends to and connects with a generally annular plenum chamber 29 in turn connected to a plurality of hot gas sources 31 and 32. The precise nature of the source of propulsive force is subject to engineering selection and the hot gas generators 31 and 32 are utilized primarily as examples. The arrangement is such that while normally both (or all, if there are more than two) of the gas generators 31 and 32 operate at once and are effective to supply all of the various motors 26, it is still possible for the vehicle to operate if one or a few of the gas motors or generators are disabled. Should that occur, it is desirable to prevent adverse or backflow from the active gas generator or generators into the inactive one. For that reason between each of the gas generators and the plenum there is provided a check valve 33. This is pressure actuated and effectively isolates its own gas generator in the event there is a failure therein.

The plenum 29 is large enough so that all of the pipes 28 are well supplied from the gas generators, the main point being to assure an adequate supply of motive fluid even under adverse conditions.

In the preferred operation, the gas generators supply all of the motors 26 so that all of the fans or propellers 24 operate at substantially the same speed and preferably all in the same direction of rotation. Because of the large number of individual fans or propellers and the distribution of the various pipes with respect to the body, there is not only provided a lift center substantially on the axis 7, but also the amount of angular momentum derived from the operation of all of the fans in one direction is sufficient to provide gyrostabilization. This by itself may be the simplest manner in which to afford sufficient stability of the vehicle, but I contemplate additional or alternative means for this purpose.

For example, the fan 24 may not be mounted directly on the shaft 27 but instead may have a gimbal mounting 36 with respect thereto. Thus, the axis of rotation of the fan can depart by a matter of a few degrees, say 2° or 4° from the axis 22 of the duct. The fan is free to rock to this limited extent in response to various motions of the body 6 in the air. The gimbal motion between the fan and its surroundings is utilized to actuate additional controls for stability.

For one instance, the tilting of the fan is communicated by a connecting lever 37 to a rod 38 which, through an intermediate lever 39, actuates a throttle 41 in the pipe 28 leading to the fan motor 26. When the fan 24 is not in its normal position; that is, does not have its plane of rotation normal to the axis 22, then there is corresponding throttling in the pipe 28, and the motor 26 and the fan 24 are slowed. The throttling effect occurs in each individual pipe in accordance with the response of each individual fan to local disturbing forces. The throttling of an individual pipe slows its own individual fan and results in a redistribution of the hot gases in the plenum 29 so that the other corresponding motors are maintained at speed or may even be increased in speed. This tends to compensate for unwarranted local excursions from the desired attitude of the craft.

Also in the pipe 28 is a shutoff valve 42 controlled by an operator 43 so that, if desired, the motor 26 can be throttled back or can actually be shut down. This is not an automatic control function but is a means for reducing the number of motors and fans in operation.

In addition to the control which is afforded by the gimbal-mounted or rockable fan I provide a trim control 46 which can be manually set to any desired position for relatively long term operation and to afford compensation for any unusual long term undesired attitude of the craft. The control 46 is connected by a rod 47 to a balance lever 48 joined at its center by a rod 49 to the lever 39. The operation of the trim control 46 effects a tilting of the fan 24 with respect to its duct and thus provides a correcting component to the attitude of the craft. There can be individual controls such as 46 for each of the fans or adjacent fans can be coupled with a similar control.

In addition to the relatively long term trim control 46, I also provide a relatively short term trim control 51. This is joined by a rod 52 to the other end of the balance lever 48 and can independently introduce an attitude correction through the fan 24. Preferably the manual controller for the long term trim control 46 is an adjustable wheel or the like, whereas the short term trim controller 51 can be connected conveniently to thumb buttons on the control stick for the entire craft. The operator by moving his thumb fore and aft can influence the short term controls related to the fans in the ducts 13 and 16 on one side and 17 and 20 on the other, for example. By moving his thumb sideways he can actuate similar controls connected to the fans 14 and 15 on one side and 18 and 19 on the other. In this way the operator can introduce and remove instantaneous correctional thrust vectors from the individual fans.

As an additional control of the jet issuing from each duct, I provide at the lower end of the duct an adapter 56 in the nature of a ring which can be rotated around the axis 22 by means of a control rod 57 joined to an upstanding anchor 58 on one portion of the adapter 56. This rod 57 is for the purpose of producing rotation of the adapter 56 about the axis 22 as a center so that a number of diametrically extending parallel vanes 61 can be oriented in any direction desired. In this fashion the craft can be directed forwardly, rearwardly or laterally in either direction. In fact, the control is preferably such that some of the adapters 56 can be directed together in one direction whereas others can be directed in somewhat different directions. For example, at low speeds it is usually arranged that the ducts 14 and 15 on one side and 18 and 19 on the other side are directed substantially backward or aft, and then at high speeds all of the adapters are directed aft so that all of the jets cooperate to propel the craft in the forward direction. At low speeds the adapters not oriented for forward propulsion may be turned slightly to assist in correcting for yaw or for producing maneuvering deviations from a normal straight flight path.

The adapter 56 is additionally provided with a control rod 63 connected to an anchor 64 on the adapter, so that by moving the rod 63 up and down the adapter can be rocked about the interconnection of a flange 66 at the bottom of the duct and an encompassing rim 67 on the adapter. As shown in FIG. 2, the adapter is in a lower position so that the upper ends of all of the vanes 61 lie in the plane making an angle B with the plane at the bottom of the duct and normal to the axes 22 and 7. As the rod 63 is raised and lowered the effective cross section of discharge of the jet is varied from its maximum amount when the angle B is zero to its minimum amount when the angle B is as shown in FIG. 2. Since a maximum jet downward thrust is required for lift, especially initial lift, the maximum cross-sectional area of efflux is then employed by having the angle B zero. On the contrary, for forward flight a considerably less area of efflux is desirable. Then the angle B is made maximum or some large fraction of maximum, so that there is not only a downward but also a rearward component, and so that the area of efflux is considerably less than maximum.

The vanes 61 are in part flexible but at their upstream ends 68 are fixed to the adapter 56. The flexible downstream vane ends are moved jointly by a control rod 69 movable to and fro. The vanes can be flexed at their trailing ends with respect to the adapter. Since the vanes can be so flexed relative to their fixed ends 68, they can be bent through various angles A as measured between the axis 22 and the general plane of the vane. In this way, by having the two control rods 63 and 69 it is possible to vary the area of the outlet of the duct and also independently to vary the discharge direction of the vanes. The flexed direction of the vanes 61 is important in altering the direction of efflux of the air. Thus by rotating the adapter 56 through the rod 57, by rocking the adapter 56 by moving the rod 63 up and down, and by changing the flex angle of the vanes 61 by moving the rod 69 to and fro, it is possible to provide an optimum discharge from each duct and to control the direction of such efflux and its quantity in order to govern the operation of the vehicle.

As a matter of additional safety, in the event one of the motors 26 should fail and should release large quantities of hot gas to the atmosphere or should a pipe 28 similarly fail, I preferably provide in each one of the pipes 28 a pressure-responsive cell 72 connected to a damper 73 in the duct adjacent the plenum 29. The cell 72 is effective when the pressure within the pipe between the plenum and the motor drops abruptly to close the damper 73 and prevent loss of propulsion gas. Because of the relatively large number of engines, the loss of one is not unduly serious because the propulsive gas which normally would go to it is distributed to the remaining engines and causes them to operate to a somewhat greater effect.

Instead of using propellors or fans as means for inducing airflow through the ducts, I can alternatively use thrust augmentors as shown in FIGS. 3 and 4. In this instance the construction of the aircraft, unless specially noted, is the same as previously described. In each of the ducts, such as 14, however, there is provided a streamlined chamber 81 coaxially mounted and having a grid 82, such as a honeycomb, spanning the annular channel 83 between the body 6 and the chamber 81. Just beneath the grid 82 is an array of radially disposed pressure gas nozzles 84. These are all alike and each is a hollow streamlined body having one or more series of jet discharge apertures 86 along or near its lower edge. Each of the nozzles 84 in a particular group is connected to the supply pipe 28 extending to the plenum 29 as a source of pressure gas. The issuance of the numerous gas jets downwardly from the nozzles 84 induces a related downflow of atmospheric air through the duct 14 and in a simple and efficient way affords lift for the vehicle.

Since one of the main aims of the invention is to provide excellent stability and control, it is arranged that the nozzles 84 in any one duct be controlled as an individual group. For example, a number of control gyros 87 can be provided each one being disposed adjacent its respective one of the ducts such as 14. The gyros 87 are duplicates and each is driven by its own electric motor 88 to afford a highly redundant system. Each gyro 87 through a path 89 exerts control of a flow valve 90 in the pipe 28 to vary the amount of pressure gas supplied to the adjacent nozzles 84 and so controls the resulting amount of thrust. Also, if desired, the control path 89 can be extended to the rods 57 and 63 as well as to the control rod 69. Thus deviations from the set or desired conditions at each of the ducts, such as 14, is effective upon the local gyro 87 to provide appropriate and unique compensation.

The thrust augmentors of FIGS. 3 and 4 can be modified, as shown in FIG. 5, for improved results in many cases. Each duct 14 has a chamber 91 fixed therein and defining an annular channel 92 between the chamber and the body 6. A nozzle ring 93 is mounted to rotate on the chamber 91 by means of a bearing 94 and is closed by seals 96. The supply pipe 28 opens into the chamber 91 and gas flows from the chamber through openings in the ring into hollow pressure gas nozzles 97. The nozzles are inclined so that when gas issues from discharge apertures 98 therein, the nozzles and ring are rotated.

It will be appreciated that since there is a large number of individually operable jet airstreams through the body of the craft, and since each one of the jet streams can be variously controlled, directed and regulated, it is possible to provide an extremely safe and versatile control for the craft. It will also be appreciated that these controls can be interrelated in various different ways, some of the controls being paired, some being individually operable, and some being combined in larger numbers. It is even possible to provide a programmer for virtually all of the controls except for the manual override retained by the operator.

What is claimed is:

1. An aircraft comprising a disclike body that is substantially a figure of revolution about a main axis, a plurality of air ducts extending through said body in a direction parallel to said axis, said ducts being arranged in an arcuate series, a plurality of airflow-inducing means, means for mounting each of said inducing means in a respective one of said ducts for rotation about an airflow axis parallel to said main axis, and in which each of said airflow-inducing means includes a fan connected to power-driving means, means mounting said fan in gimbals to swing freely through a limited range relative to said body, and means responsive to the swinging movement of said fan relative to said body for controlling said power driving means, a plurality of rotary members, means for mounting each of said members on a respective one of said ducts downstream of said inducing means therein and for rotation about said airflow axis, parallel deflector vanes extending transversely of each of said rotary members, and means for deflecting said deflector vanes.

2. An aircraft as in claim 1 in which each of said airflow-inducing means is movable independently of the other airflow-inducing means.

3. An aircraft as in claim 1 including means associated individually with each one of said airflow-inducing means and responsive to shifting of the axis thereof in one plane out of parallelism with said main axis for controlling operation of said one of said airflow-inducing means.